(12) United States Patent
Wang et al.

(10) Patent No.: US 11,466,423 B2
(45) Date of Patent: Oct. 11, 2022

(54) UTILITY COVER

(71) Applicant: Hubbell Incorporated, Shelton, CT (US)

(72) Inventors: Hsi Jen Wang, Aiken, SC (US); Cauley Sean Price, Aiken, SC (US); Jerry Dale Goolsby, Aiken, SC (US); Lemuel David Fagan, Lenoir City, TN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/886,159

(22) Filed: May 28, 2020

(65) Prior Publication Data

US 2020/0378084 A1 Dec. 3, 2020

Related U.S. Application Data

(60) Provisional application No. 62/855,452, filed on May 31, 2019.

(51) Int. Cl.
*E02D 29/14* (2006.01)
*H02G 9/10* (2006.01)

(52) U.S. Cl.
CPC ......... *E02D 29/1454* (2013.01); *E02D 29/14* (2013.01); *H02G 9/10* (2013.01); *E02D 2300/0045* (2013.01); *E02D 2300/0053* (2013.01); *E02D 2300/0071* (2013.01)

(58) Field of Classification Search
CPC . E02D 29/14; E02D 29/1418; E02D 29/1445; E02D 29/1454; E02D 29/1472

USPC ............................ 404/25; 49/463; 52/19, 20
See application file for complete search history.

(56) References Cited

U.S. PATENT DOCUMENTS

| 5,123,776 A | 6/1992 | Lang et al. |
| 2013/0263425 A1 | 10/2013 | Miller et al. |
| 2015/0263502 A1 | 9/2015 | Tipton et al. |
| 2016/0297607 A1 | 10/2016 | Burke et al. |

FOREIGN PATENT DOCUMENTS

| AU | 2014101497 | 2/2015 |
| GB | 2261240 | 5/1993 |
| GB | 2498872 A * | 7/2013 |

(Continued)

OTHER PUBLICATIONS

PCT/US202/034905 International Search Report and Written Opinion dated Aug. 11, 2020.

*Primary Examiner* — Sunil Singh
(74) *Attorney, Agent, or Firm* — Michael Best & Friedrich LLP

(57) ABSTRACT

A cover for an underground enclosure may include an upper surface and may include a pattern of bosses, and a first slot and a second slot each disposed on the upper surface. The cover may also include a lower surface opposite the upper surface. A first rib or reinforcement member may be coupled to the lower surface. The first slot may extend into the first rib or reinforcement member. A second rib or reinforcement member may be coupled to the lower surface and aligned with the first rib or reinforcement member. The second slot may extend into the second rib or reinforcement member. The cover may be configured to be lifted by the first slot and the second slot.

13 Claims, 14 Drawing Sheets

(56) References Cited

FOREIGN PATENT DOCUMENTS

| JP | 3893689 | 12/2006 |
|----|---------|---------|
| JP | 2007321430 | 12/2007 |
| JP | 3179743 | 10/2012 |

* cited by examiner

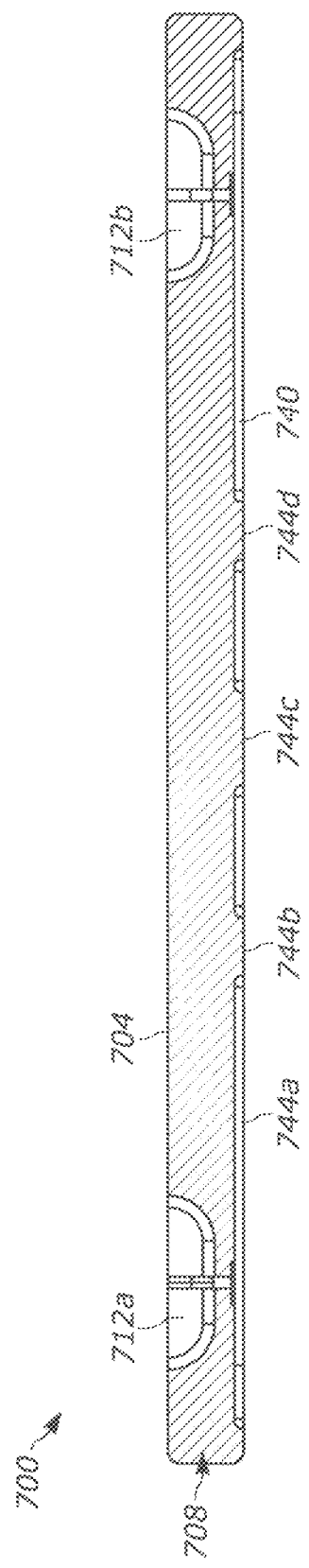

UTILITY COVER

FIELD

The present disclosure relates to a cover for an underground utility enclosure and, more specifically to a lightweight cover that allows for easy removal from the enclosure.

BACKGROUND

Underground enclosures or boxes may be used to house cables (e.g., electrical conductors) used in utilities, or other similar applications. The underground enclosures typically include a cover or lid in order to enclose or protect the cables within the enclosure. The enclosures may be positioned in high traffic areas (e.g., near sidewalks, roadways, etc.). The lids, which may be positioned at ground level, may need to be able to withstand the weight of the passing traffic. In order to withstand this weight (e.g., from pedestrians, vehicles, etc.), lids may be made from polymer concrete. While polymer concrete offers the structural integrity necessary to withstand this force, it may also significantly increases the overall weight of the lid. The increased weight of the lid caused by the polymer concrete may make handling the lid difficult. For example, it may be challenging to remove the lid in order to access the cables within the enclosure.

SUMMARY

In one embodiment, a cover for an underground enclosure may include an upper surface that may include a pattern of bosses, and may further include a first slot and a second slot each disposed on the upper surface. The cover may also include a lower surface opposite the upper surface. A first rib may be coupled to the lower surface. The first slot may extend into the first rib. A second rib may be coupled to the lower surface and may be aligned with the first rib. The second slot may extend into the second rib. Additionally, the cover may be configured to be lifted by the first slot and the second slot.

Other aspects of the disclosure will become apparent by consideration of the detailed description and accompanying drawings.

BRIEF DESCRIPTION OF THE DRAWINGS

FIG. 14 is a cross-sectional view of the cover of FIG. 12, viewed along line 14-14.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a cover for an underground enclosure (e.g., a utility enclosure housing electrical cables). The cover may include a lightweight design that allows a user to be able to remove the lid from the underground enclosure.

Figure 6:
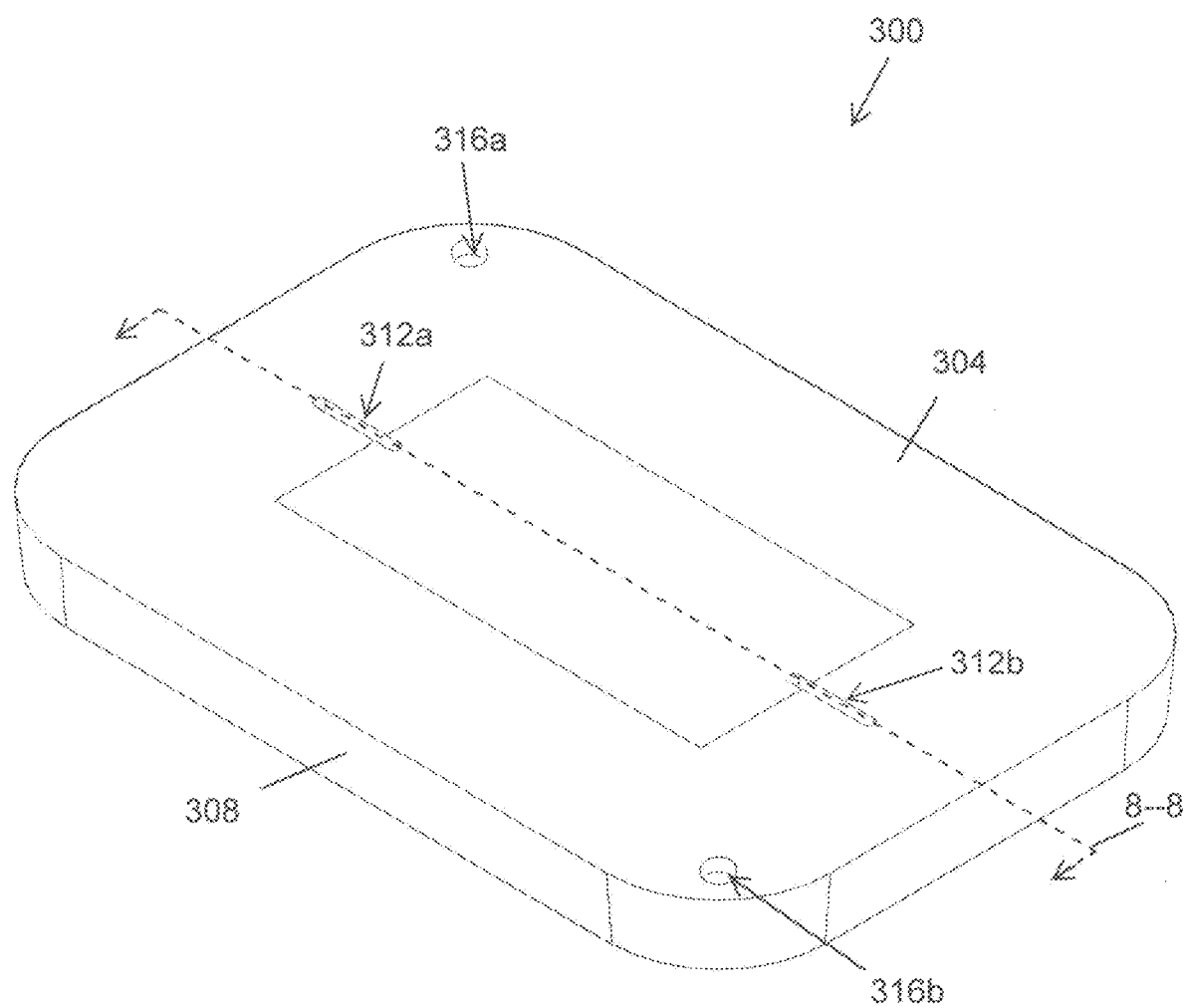
FIG. 6 is a perspective view of a cover according to another embodiment.
Figure 7:
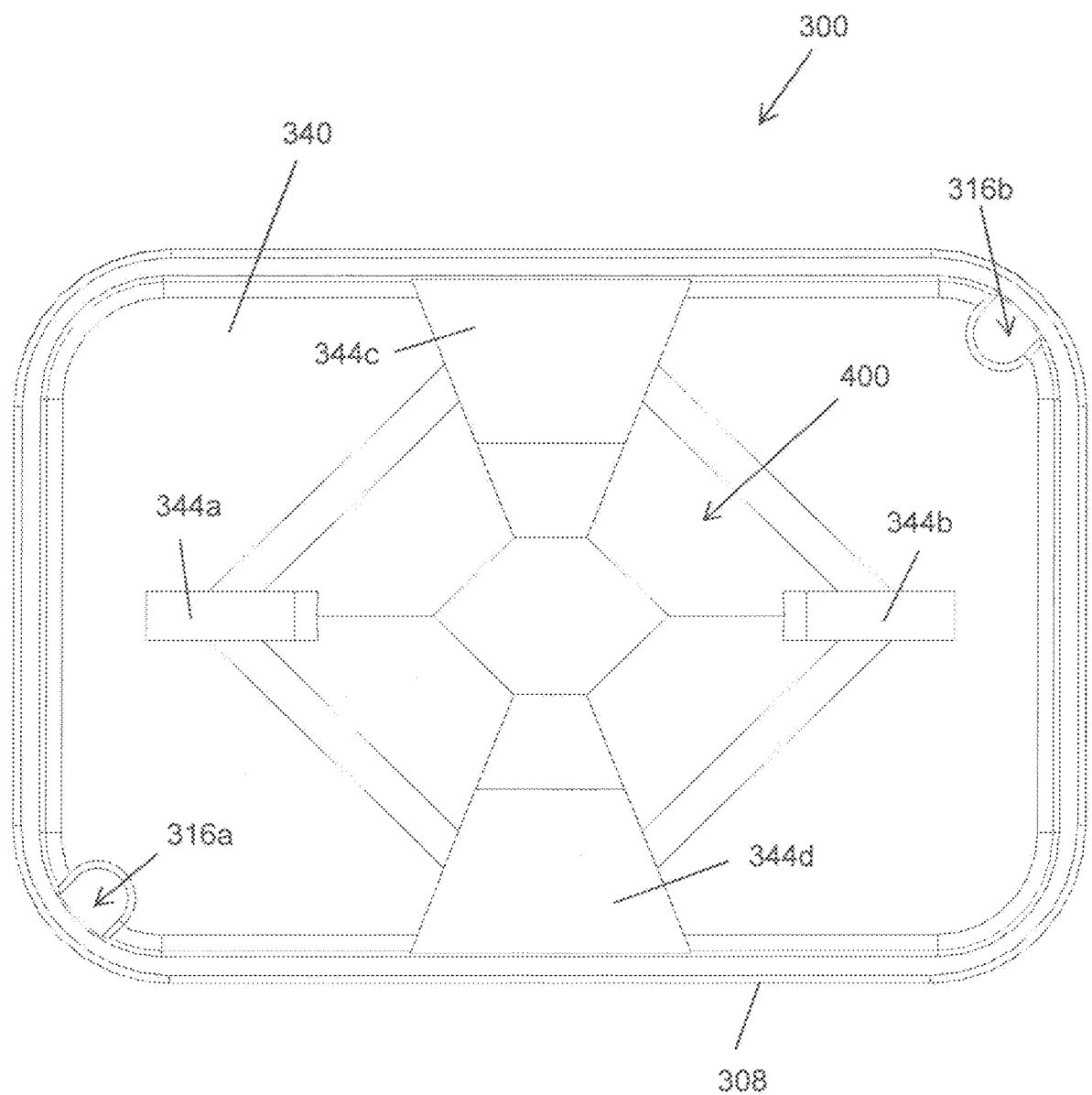
FIG. 7 is a bottom view of the cover of FIG. 6.
Figure 8:
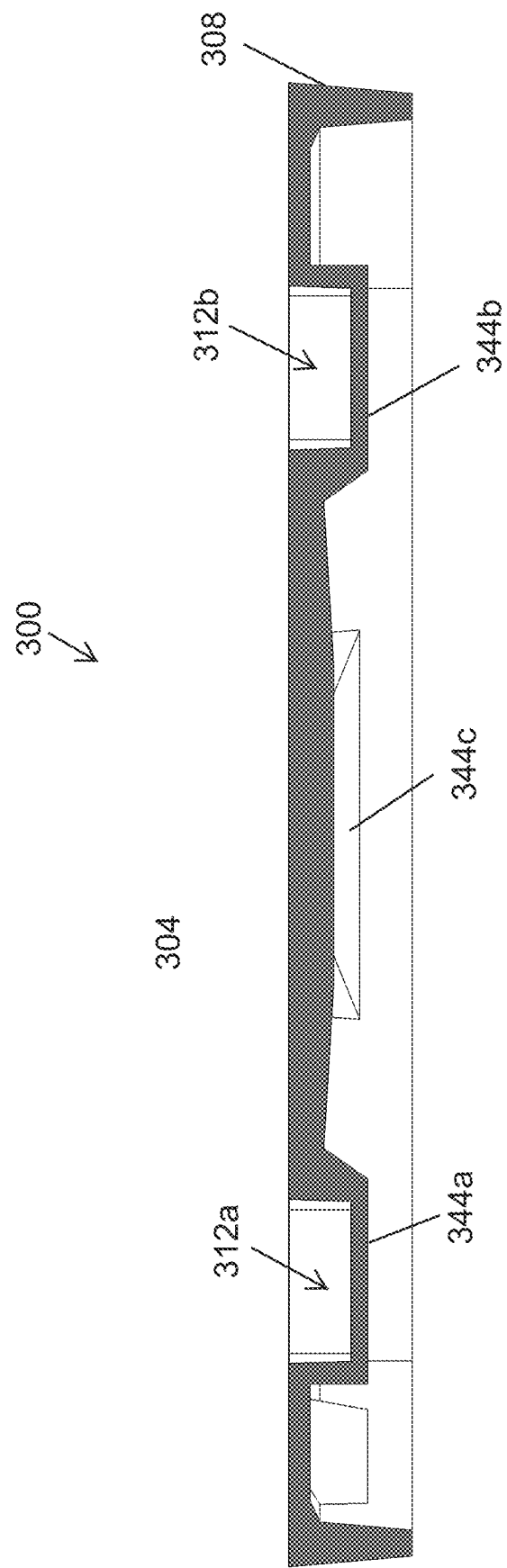
FIG. 8 is a cross-sectional view of the cover of FIG. 6, viewed along line 8-8.
Figure 9:
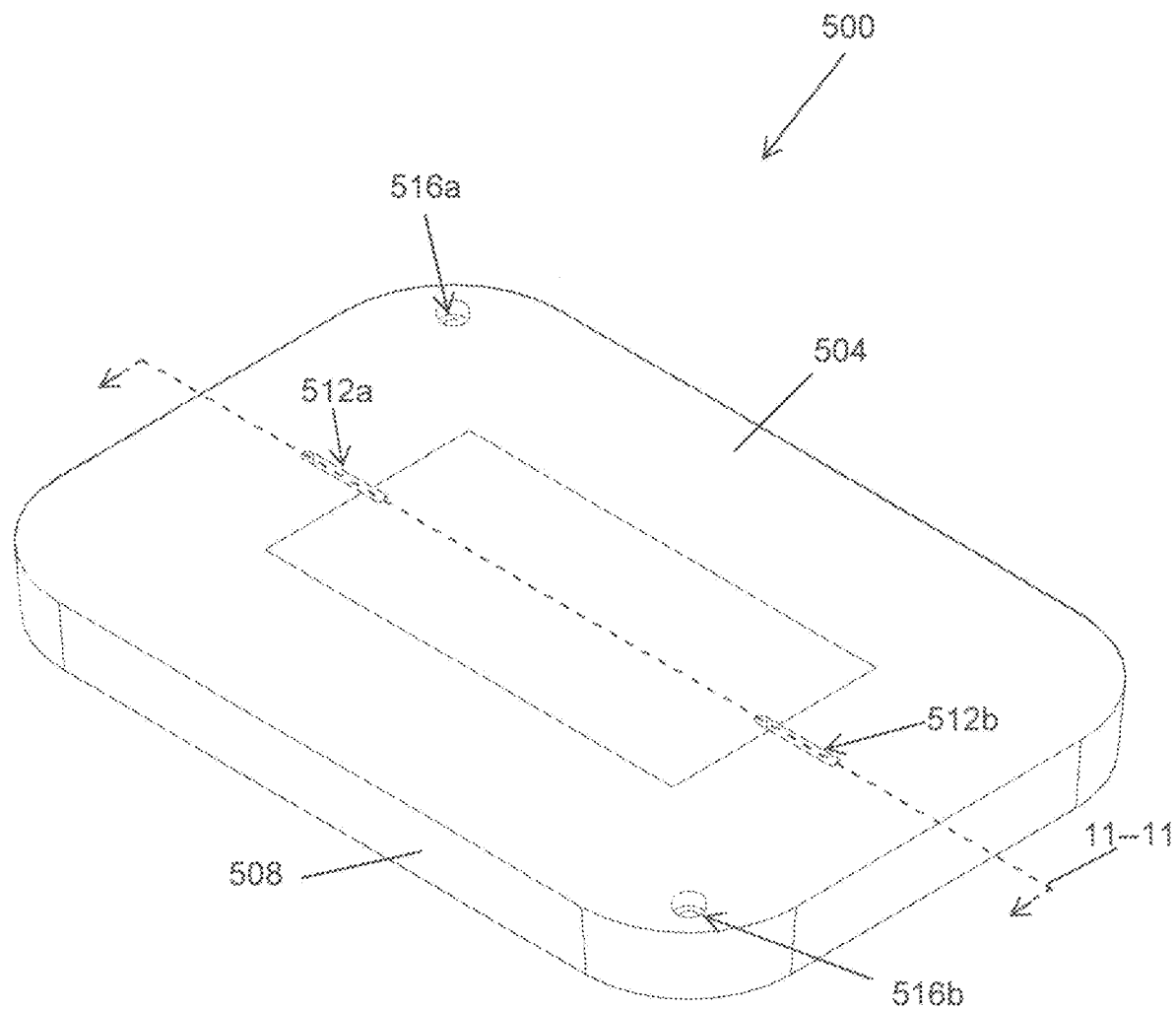
FIG. 9 is a perspective view of a cover according to another embodiment.
Figure 10:
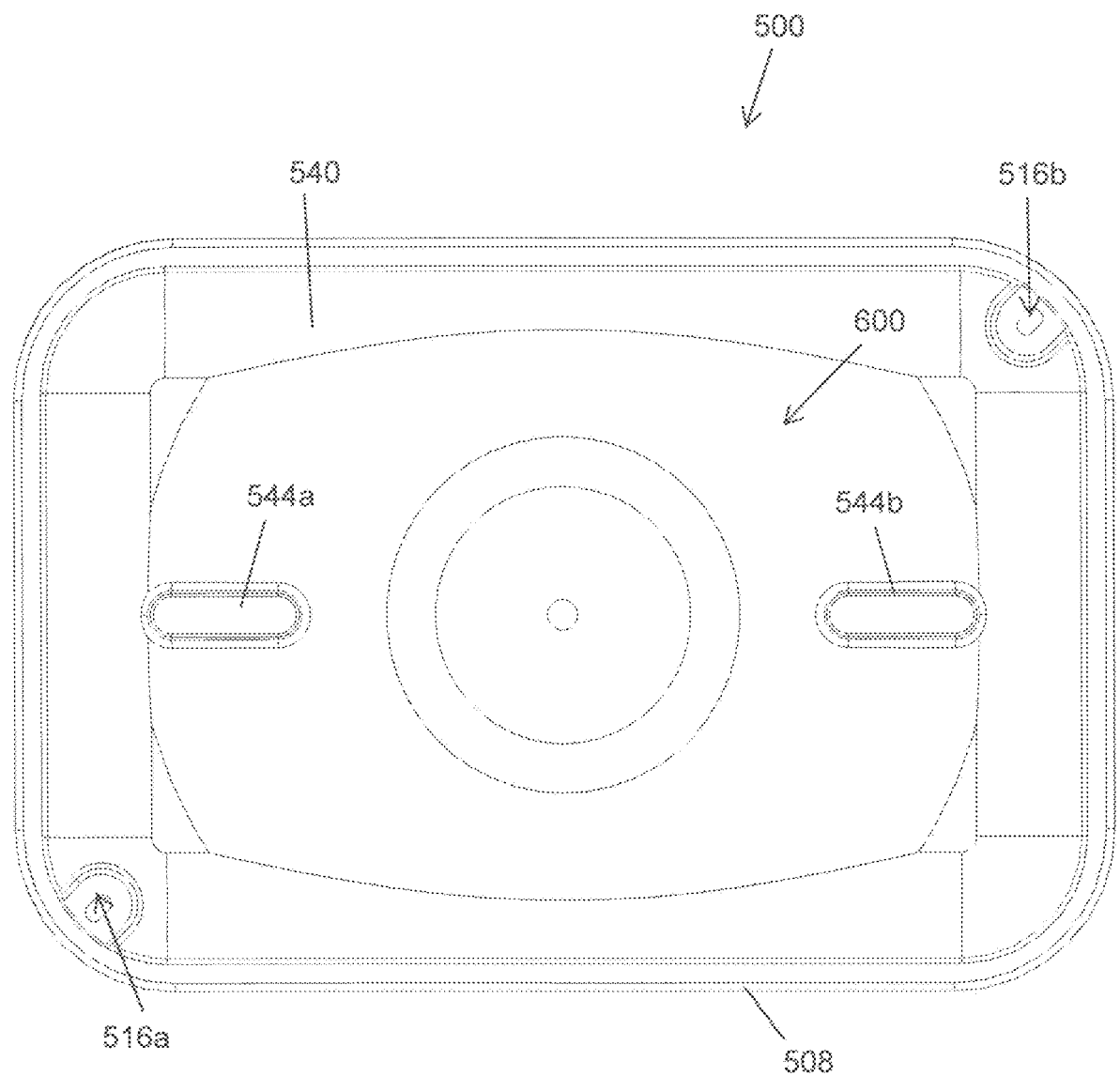
FIG. 10 is a bottom view of the cover of FIG. 9.
Figure 11:
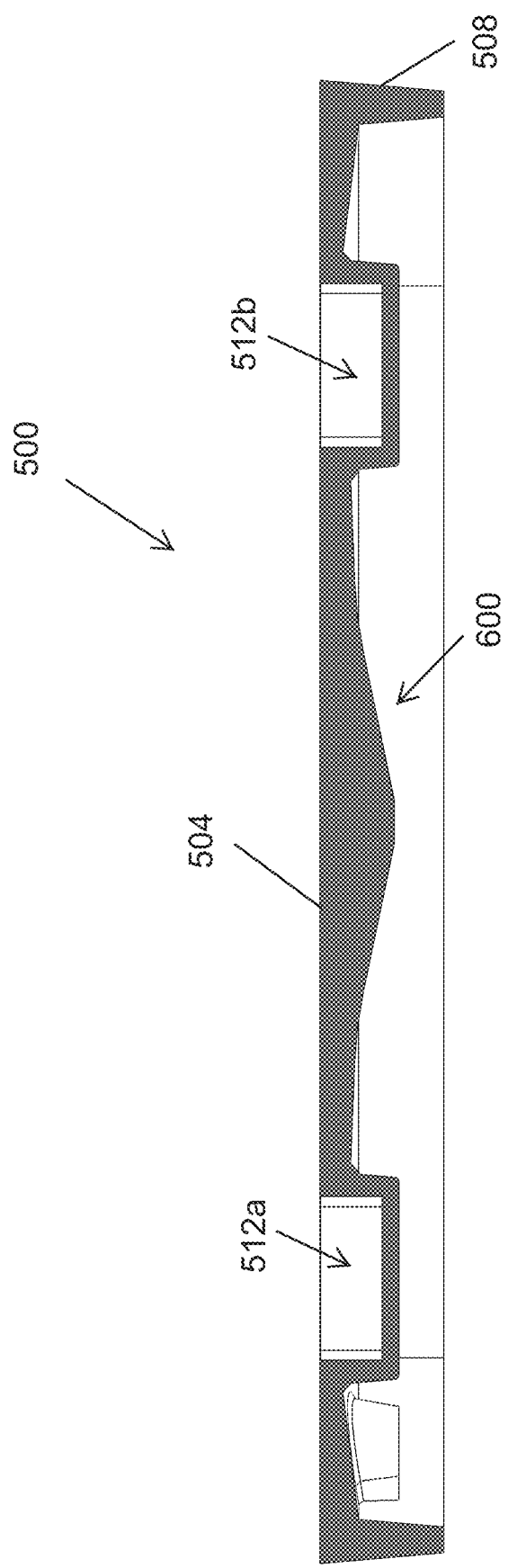
FIG. 11 is a cross-sectional view of the cover of FIG. 9, viewed along line 11-11.
Figure 12:
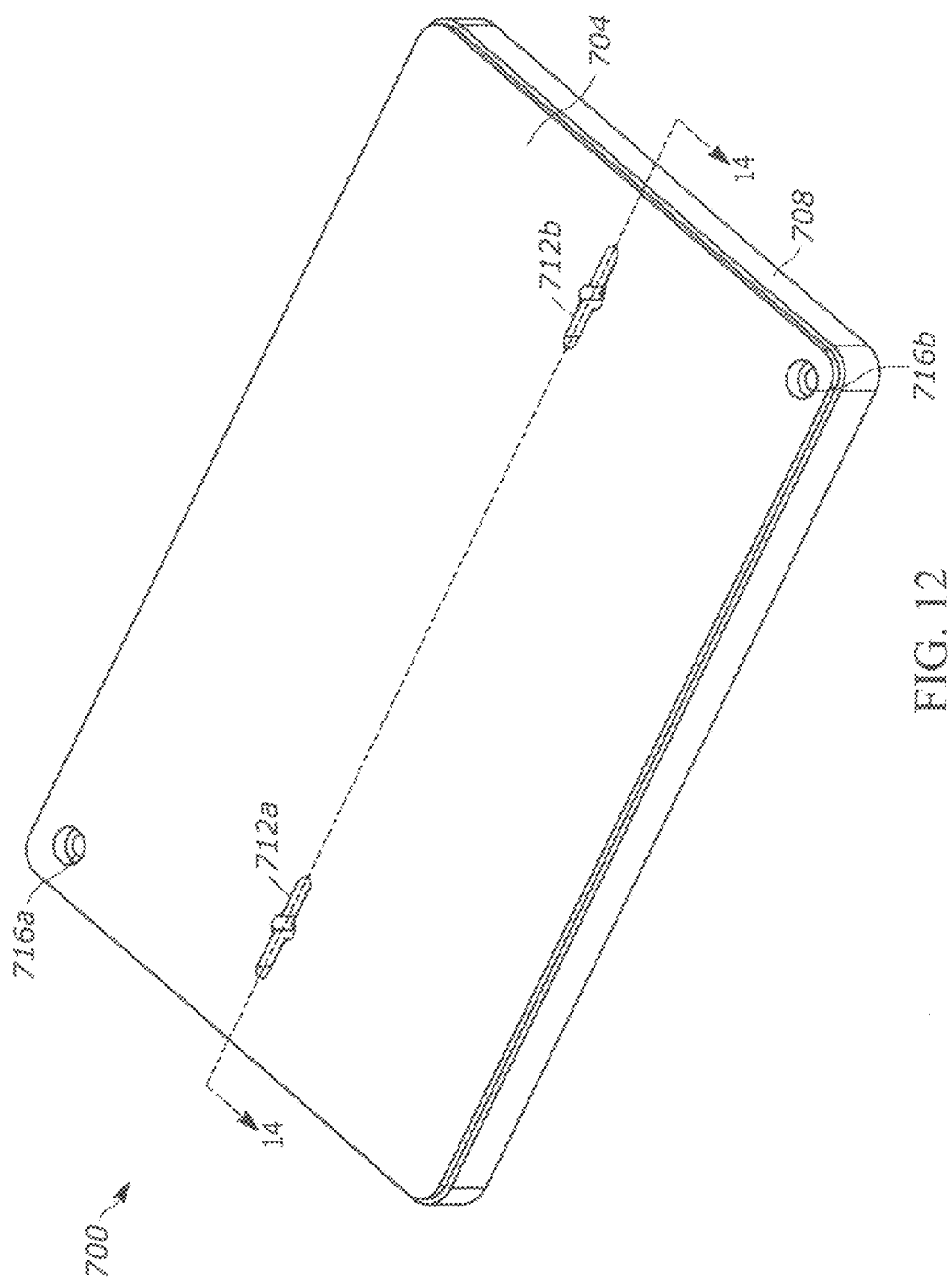
FIG. 12 is a perspective view of a cover according to another embodiment.
Figure 13:
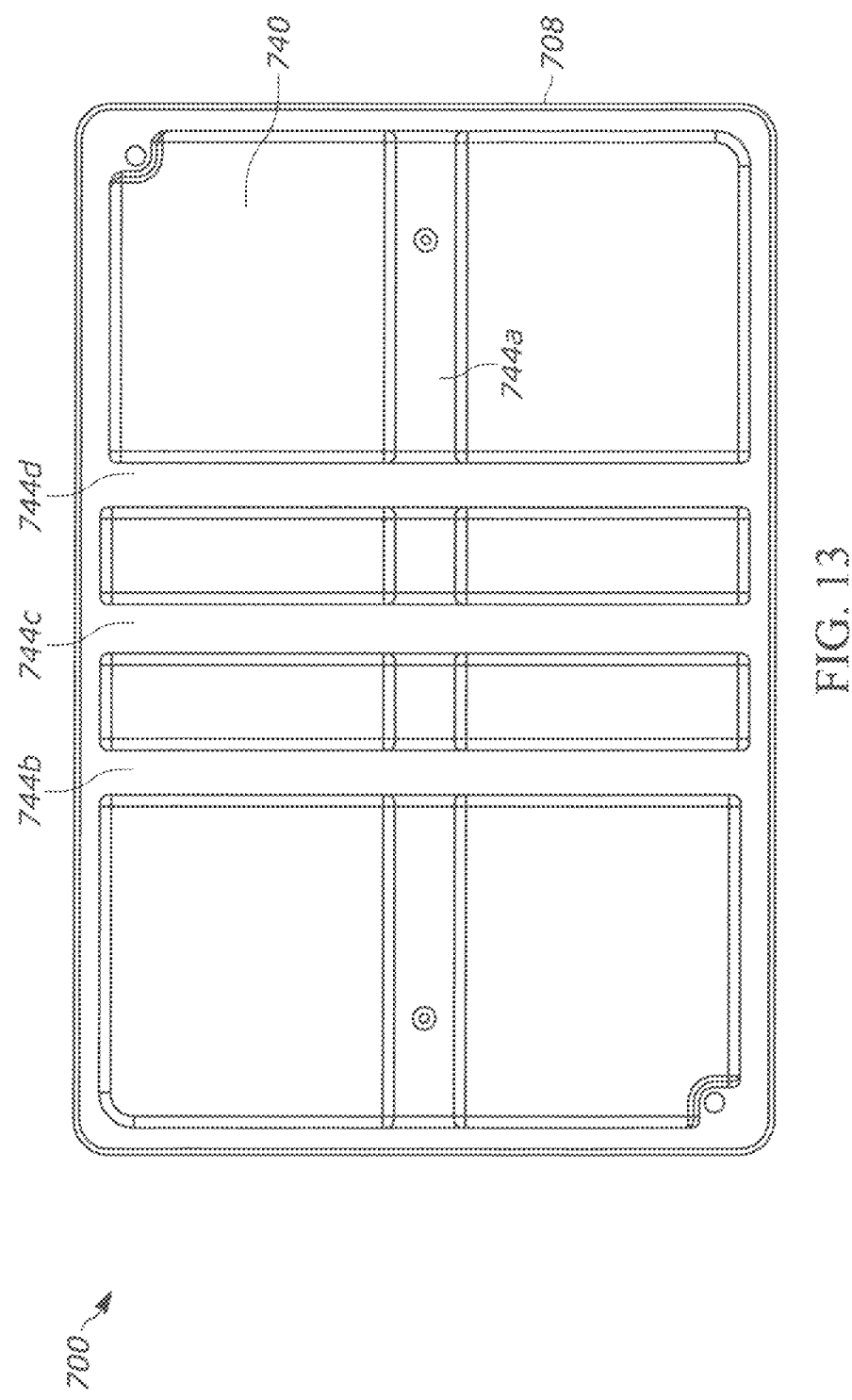
FIG. 13 is a bottom view of the cover of FIG. 12.

FIGS. 1-5 illustrate a cover, generally designated 100. The cover may be used to enclose an enclosure. FIGS. 6-8 illustrate a cover 300 according to another embodiment. FIGS. 9-11 illustrate a cover 500 according to yet another embodiment. FIGS. 12-14 illustrate a cover 700 according to still another embodiment. At least some similarities and differences between the cover 100, the cover 300, the cover 500, and the cover 700 are described below. Similar features are identified by similar reference numbers, where possible.

Figure 1:
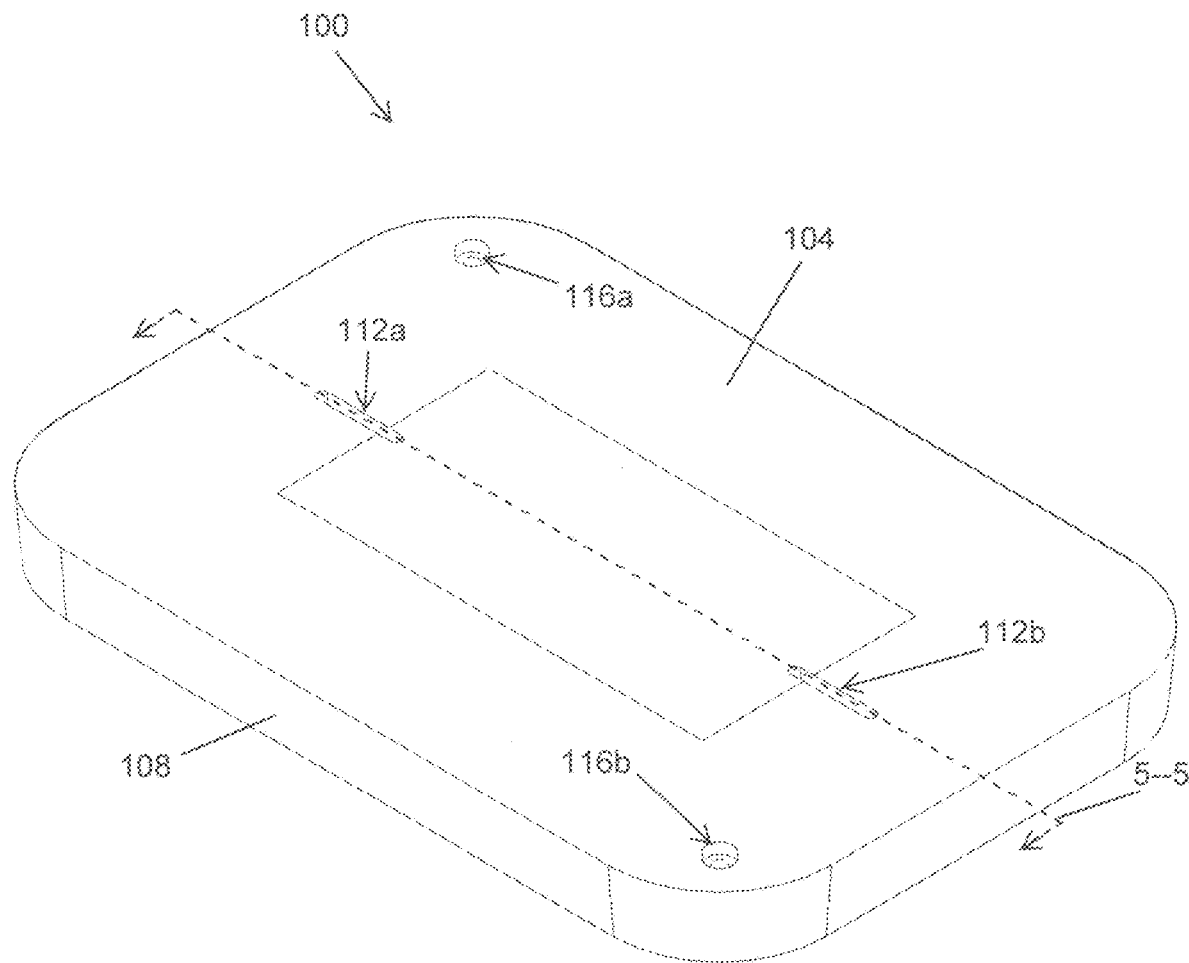
FIG. 1 is a perspective view of a cover for an underground enclosure.

As shown in FIG. 1, the cover 100 may include an upper surface 104 and a side surface 108 that may extend from the upper surface 104. As shown in the illustrated embodiment, the upper surface 104 may define a substantially rectangular shape. For example, the upper surface 104 may include two pairs of parallel sides and rounded corners. The side surface 108 may be a single wall that extends entirely around the perimeter of the upper surface 104. In other embodiments, the side surface 108 may extend around only a portion of the perimeter of the upper surface 104, and/or the cover 100 may include multiple side surfaces 108.

A first slot 112a and a second slot 112b may be disposed on the upper surface 104. In the illustrated embodiment, the first and second slots 112a, 112b may be formed as elongated openings and may be formed during a molding process. The first slot 112a may be aligned with the second slot 112b, and both slots 112a, 112b extend along a common axis. The first and second slots 112a, 112b have substantially the same shape. The first and second slots 112a, 112b may be disposed proximate a center of the upper surface 104, and the axis extending through the first and second slots 112a, 112b may also extend through the center of the upper surface 104. In other embodiments, the first and second slots 112a, 112b may be disposed at different positions and/or may be different shapes. In other embodiments, the first and second slots 112a, 112b may be constructed and arranged to incorporate an eyebolt or fastener as an anchor to be used for lifting. In a number of embodiments, first and second slots 112a, 112b may be formed during a molding process but capable of being widened after the molding process by shaving, grinding, cutting, or by any other process known for shaping polymers. In some cases, an eyebolt may be removably disposed in first and second slots 112a, 112b by a fastener, clips, or the like so that the eyebolt may be removed or replaced if worn or damaged. In such cases, the fastener or clips may be part of the eyebolt itself.

A first aperture 116a and a second aperture 116b may also be disposed on the upper surface 104. In the illustrated embodiment, the first and second apertures 116a, 116b may be generally circular. The first and second apertures 116a, 116b may also be disposed proximate a respective corner of the upper surface 104. In other embodiments, the first and second apertures 116a, 116b may be different shapes and/or disposed in different locations of the upper surface 104.

Figure 2:
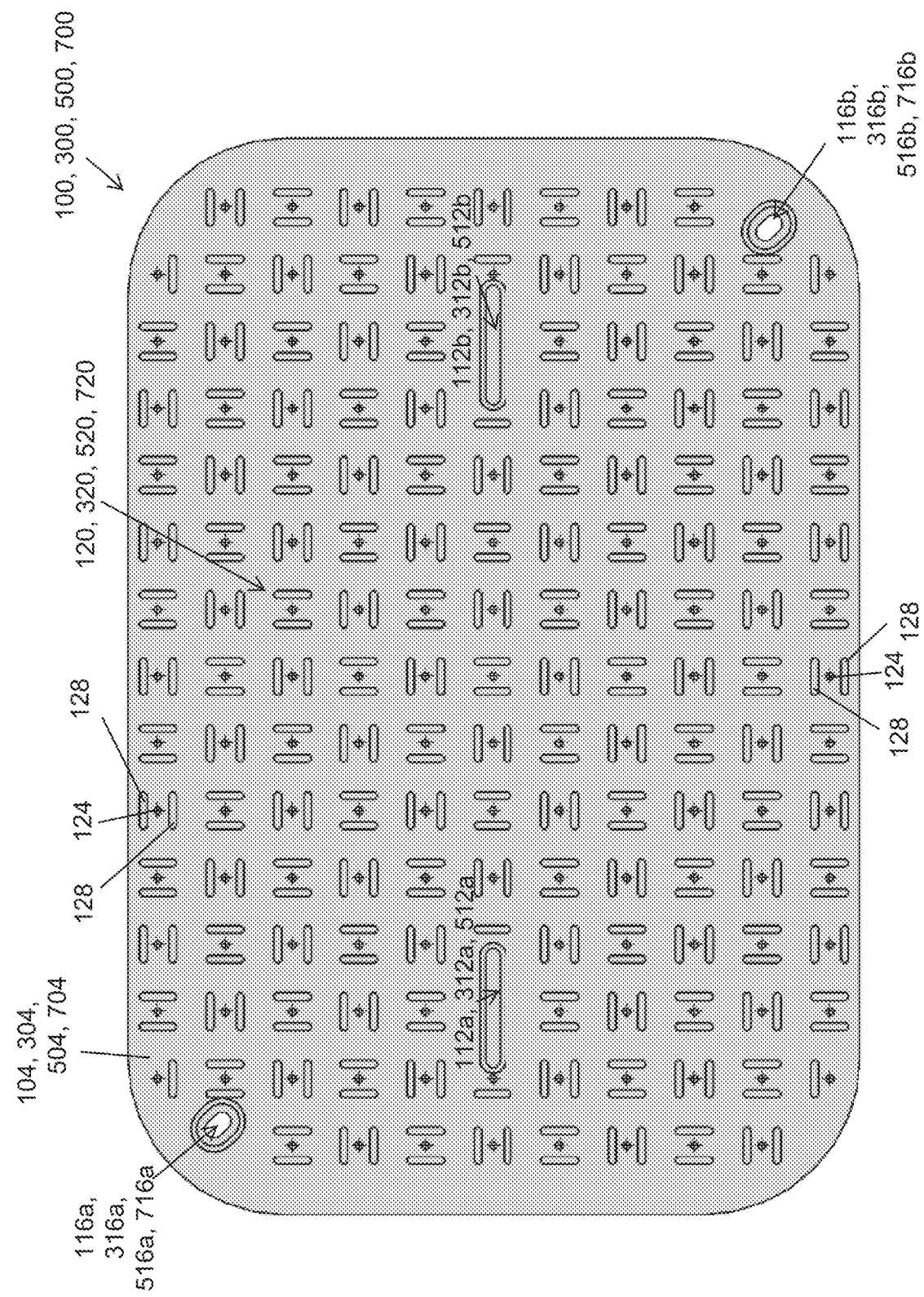
FIG. 2 is a top view of the cover of FIG. 1, illustrating a first pattern.
Figure 3:
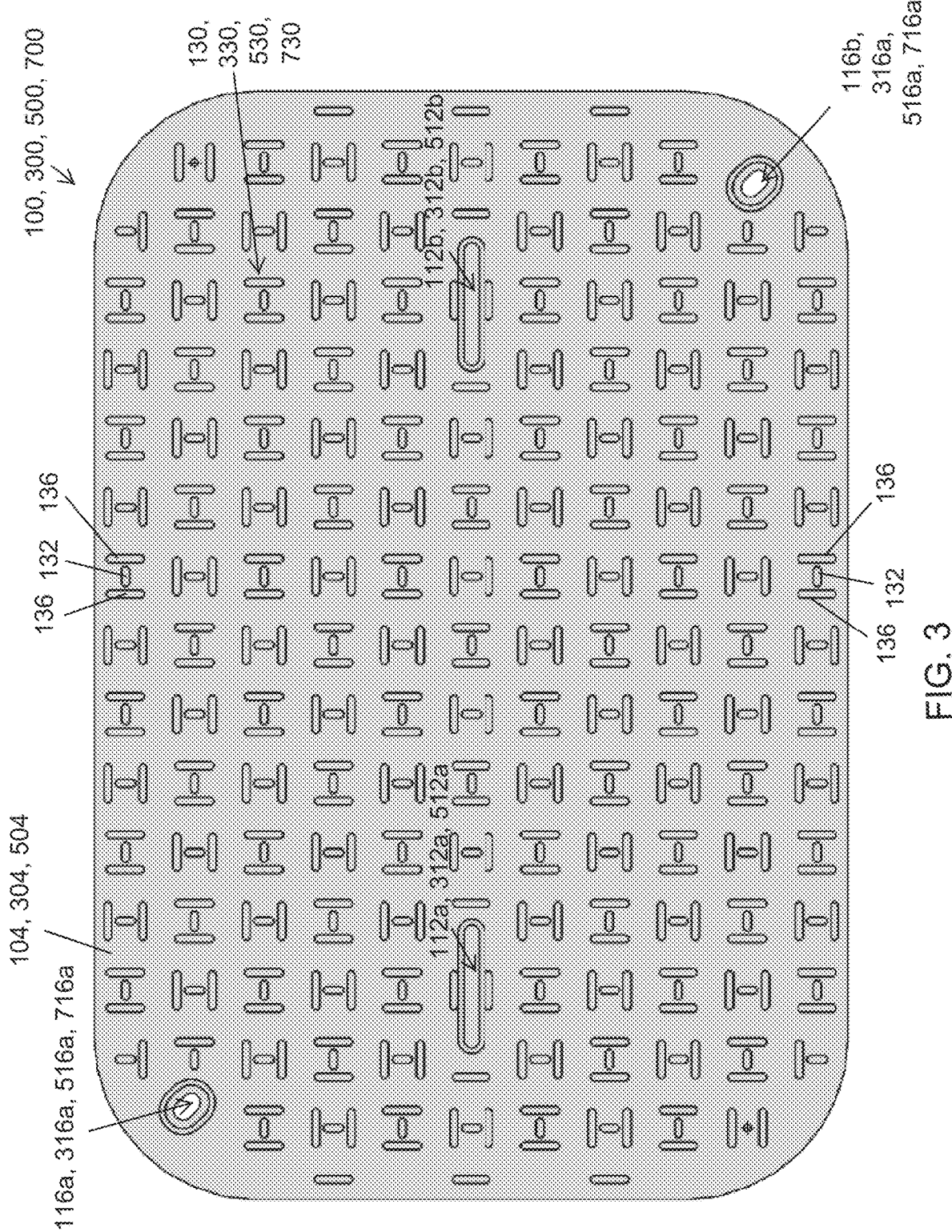
FIG. 3 is a top view of the cover of FIG. 1, illustrating a second pattern.

As shown in FIGS. 2 and 3, the upper surface 104 may include different patterns along at least a portion of the upper surface 104. The patterns may define raised bosses that extend from the upper surface 104. In some embodiments, the upper surface 104 may include a first or "H-Dot" pattern 120 (see e.g., FIG. 2). The H-Dot pattern may include a point bosses 124 surrounded by a pair of elongated bosses 128. In other embodiments, the upper surface 104 may include a second or "H" pattern 130 (see e.g., FIG. 3). The H pattern may include a first elongated boss 132 and a pair of second elongated raised bosses 136 disposed generally orthogonally with respect to the first elongated boss 132.

Figure 4:
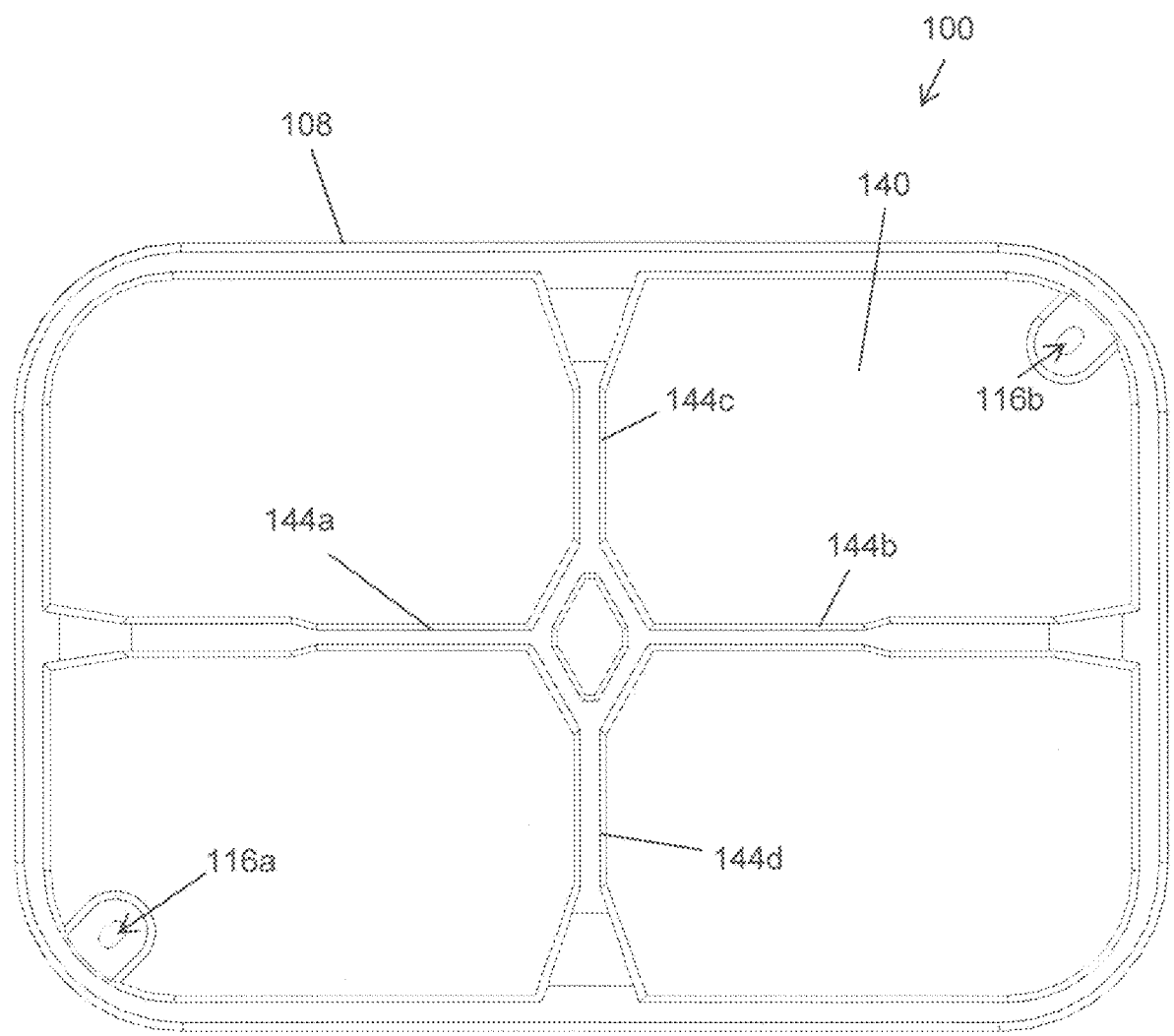
FIG. 4 is a bottom view of the cover of FIG. 1.

As shown in FIG. 4, the cover 100 may include a lower surface 140 that may be disposed generally opposite of the upper surface 104. The side surface 108 may extend beyond the lower surface 140 such that the lower surface 140 is recessed relative to an end of the side surface 108. Reinforcement members or ribs 144 may be coupled to the lower surface 140 and extend toward the end of the side surface 108. As shown in the illustrated embodiment, the cover 100 may include four ribs 144a-144d. In other embodiments, the cover 100 may include more or fewer ribs 144.

Each rib 144a-144d may be coupled to the side surface 108 and extends toward a center of the lower surface 140. Each rib 144a-144d may be disposed approximately orthogonally with respect to the adjacent two ribs 144a-144d. In the illustrated embodiment, the ribs 144a-144d may be integrally formed with the side surface 108. Additionally, the ribs 144a-144d may meet at approximately the center of the lower surface 140 and may be integrally formed with each other. Together, the four ribs 144a-144d may form a cross shape.

Figure 5:
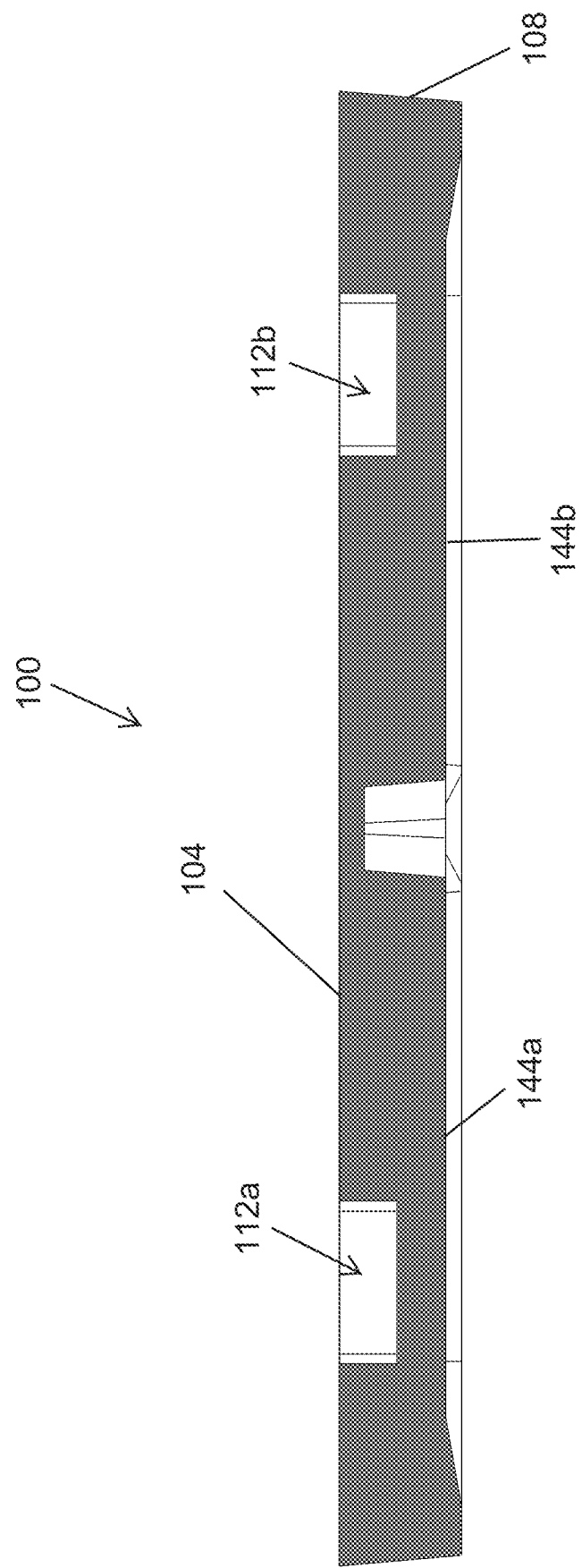
FIG. 5 is a cross-sectional view of the cover of FIG. 1, viewed along line 5-5.

As shown in FIG. 5, the ribs 144a-144d may extend substantially along a height of the side surface 108. The first slot 112a and the second slot 112b may extend into the first rib 114a 144a and the second rib 144b respectively, and may extend partially along the height of the ribs 144a, 144b. In the illustrated embodiment, the first slot 112a and the second slot 112b may extend substantially the same distance through the respective rib 144a, 144b.

To form the cover 100, a mold may be created in the shape of the cover. A mixture may be poured into the mold and allowed to cure in order to form the cover 100. The cover 100 may be formed as a unitary piece. In the illustrated embodiment, the mixture may be a resin. For example, the material may be a glass fiber reinforced polyester sheet molding compound (SMC). In some embodiments, the material may be at least 15% glass fiber. In other embodiments, the material may be at least 25% glass fiber. In other embodiments, the material may be at least 30% glass fiber. In other embodiments, the material may be at least 48% glass fiber. In still other embodiments, the material may be polymer concrete or resin impregnated balsa wood. A surface pattern may be molded into the upper surface during the molding operation. The patterns 120, 130, or upper surface may be texturized using a chemical (e.g., aluminum oxide), sand blasting, or other methods of surface augmentation.

In use, the cover 100 may be positioned on an enclosure (e.g., a underground utility box—not shown) in a high traffic area (e.g., a sidewalk or a roadway). Fasteners (e.g., bolts—not shown) may be inserted through each of the apertures 116a, 116b in order to couple the cover 100 to the enclosure. The cover 100 may be flush or substantially flush with the ground in order to allow pedestrians or vehicles to pass. The patterns 120, 130 may increase the coefficient of friction of the upper surface 104 and may reduce slippage across the surface 104. The ribs 144a-144d may provide the cover 100 with structural integrity and strength in order to withstand the weight of various objects (e.g., people, cars, etc.). The ribs 144a-144d may help to prevent the upper surface 104 from fracturing or collapsing, while also providing rigidity to the side surface 108 in order to limit flexion. The ribs 144a-144d may provide additional strength because of their placement through the center of the lower surface 140. Additionally, providing the first and second slots 112a, 112b in the respective first and second ribs 144a, 144b may serve to maintain the geometry and integrity of the ribs 144a-144d. This may also reduce the need for extra components since the slots 112a, 112b and the ribs 144a, 144b may be combined.

When a user wants to remove the cover 100 from the enclosure, hooks, loops, clips, or any other apparatus constructed and arranged to hold onto an eyebolt disposed in a slot of the cover 100 may be inserted into at least one of the first or second slots 112a, 112b. The apparatus constructed and arranged to hold onto an eyebolt may be lifted, and the cover 100 may be removed from the enclosure (i.e., the cover 100 no longer encloses an interior of the enclosure). By using the glass fiber reinforced polyester SMC material, in combination with the cross shaped ribs 144a-144d, the cover 100 may be lighter than a similarly sized cover made from polymer concrete. The cover 100 therefore may be easier to lift and maneuver.

As shown in FIG. 6, the cover 300 may include an upper surface 304 and a side surface 308 that may extend from the upper surface 304. The side surface 308 may be a single wall that may extend entirely around the perimeter of the upper surface 304. A first slot 312a and a second slot 312b may be disposed on the upper surface 304. In the illustrated embodiment, the first and second slots 312a, 312b may be formed as elongated openings and may be formed during a molding process. The first slot 312a may be aligned with the second slot 312b, and both slots 312a, 312b may extend along a common axis. The first and second slots 312a, 312b may be disposed proximate a center of the upper surface 304, and the axis extending through the first and second slots 312a, 312b may also extend through the center of the upper surface 304. In other embodiments, the first and second slots 312a, 312b may be disposed at different positions and/or may be different shapes. A first aperture 316a and a second aperture 316b may also be disposed on the upper surface 304. In other embodiments, the first and second slots 312a, 312b may be constructed and arranged to incorporate an eyebolt or fastener as an anchor to be used for lifting. In a number of embodiments, first and second slots 312a, 312b may be formed during a molding process but capable of being widened after the molding process by shaving, grinding, cutting, or by any other process known for shaping polymers. In some cases, an eyebolt may be removably disposed in first and second slots 312a, 312b by a fastener, clips, or the like so that the eyebolt may be removed or replaced if worn or damaged. In such cases, the fastener or clips may be part of the eyebolt itself.

As shown in FIGS. 2 and 3, the upper surface 304 may include different patterns of texture, bosses, or recesses along at least a portion of the upper surface 304. In some embodiments, the upper surface 304 may include the H-Dot pattern 320 or bosses, recesses, or bosses and recesses (see e.g., FIG. 2). In other embodiments, the upper surface 304 may include the H pattern 330 of bosses, recesses, or bosses and recesses (see e.g., FIG. 3). The patterns 320, 330 on the upper surface 304 of the cover 300 may be substantially the same as the patterns 120, 130 on the upper surface 104 of the cover 100.

As shown in FIG. 7, the cover 300 may include a lower surface 340 disposed generally opposite of the upper surface 304. The side surface 308 may extend beyond the lower surface 340 so that the lower surface 340 is recessed relative to an end of the side surface 308. Reinforcement members or ribs 344 may be coupled to the lower surface 340 and extend toward the end of the side surface 308. As shown in the illustrated embodiment, the cover 300 may include four reinforcement members 344a-344d. As used herein "reinforcement member" may be distinguished from "rib" in that a reinforcement member may not extend between two sides of the cover 300 or form a junction with a side surface 308 of the cover 308.

Two reinforcement members 344a, 344b may be spaced apart from the side surface 308 and two reinforcement members 344c, 344d may be coupled to the side surface 308. Each reinforcement member 344a-344d may be disposed approximately orthogonally with respect to the adjacent two reinforcement members 344a-344d. As shown in the illustrated embodiment, the reinforcement members 344c, 344d may be integrally formed with the side surface 308. Additionally, the reinforcement members 344a-344d may be integrally formed with a support structure 400. The support structure 400 may extend from the lower surface 340 toward the end of the side surface 308. The support structure 400 may be disposed generally over the center of the lower surface 340 in a generally convex orientation. Each reinforcement member 344a-344d may be formed proximate an outer edge of the support structure 400. As shown in the illustrated embodiment, the support structure 400 may have a generally rectangular perimeter that may intersect the reinforcement members 344a-344d, and a hexagonal center.

As shown in FIG. 8, the reinforcement members 344a-344d may extend partially along a height of the side surface 308, and may be spaced apart from the end of the side surface 308. It is also contemplated that the reinforcement members 344a-344d may comprise a depth or height that extends the full height of the side surface 308 or may be substantially flush with the lower surface 340. The first slot 312a and the second slot 312b may extend into the first reinforcement member 344a and the second reinforcement member 344b respectively, and may extend partially along the height of the reinforcement members 344a, 344b. As shown in the illustrated embodiment, the first slot 312a and the second slot 312b may extend substantially the same distance through the respective reinforcement member 344a, 344b.

To form the cover 300, a mold may be created in the shape of the cover 300. A mixture may be poured into the mold and allowed to cure in order to form the cover 300. The cover 300 may be formed as a unitary piece. In the illustrated embodiment, the mixture may be a resin. For example, the material may be a glass fiber reinforced polyester sheet molding compound (SMC). In some embodiments, the material may be at least 15% glass fiber. In other embodiments, the material may be at least 25% glass fiber. In other embodiments, the material may be at least 30% glass fiber. In other embodiments, the material may be at least 48% glass fiber. In still other embodiments, the material may be polymer concrete or resin impregnated balsa wood. When the cured cover 300 may be removed from the mold. The shape of the reinforcement members 344a-344d and the support structure 400 may provide simplified flow patterns during the molding process. The reinforcement members 344a-344d and the support structure 400 may provide a surface geometry that is conducive to material dispersion and flow, which may allow for a more even distribution of material in the cured cover 300. A surface pattern may be molded into the upper surface during the molding operation. The upper surface 304 may then be augmented. The patterns 320, 330, or upper surface 304 may be texturized using a chemical (e.g., aluminum oxide), sand blasting, or other methods of surface augmentation.

In use, the cover 300 may be positioned on an enclosure (e.g., a underground utility box—not shown) in a high traffic area (e.g., a sidewalk or a roadway) in a similar manner as the cover 100. The reinforcement members 344a-344d and the support structure 400 may provide the cover 300 with structural integrity and strength in order to withstand the weight of various objects (e.g., people, cars, etc.). Together, the reinforcement members 344a-344d and the support structure 400 may help to prevent the upper surface 304 from fracturing or collapsing, while also providing rigidity to the side surface 308 in order to limit flexion. The reinforcement members 344a-344d and the support structure 400 may provide additional strength because of their placement through the center of the lower surface 340. Particularly, the placement of the support structure 400 may provide a center of gravity for the cover 300 that helps to increase the overall force the cover 300 can withstand. Additionally, providing the first and second slots 312a, 312b in the respective first and second ribs 344a, 344b may serve to maintain the geometry and integrity of the reinforcement members 344a-344d. This may also reduce the need for extra components since the slots 312a, 312b and the reinforcement members 344a, 344b are combined. The cover 300 may be removed from the enclosure in a similar manner to the cover 100. By using the glass fiber reinforced polyester SMC material, in combination with the reinforcement 344a-344d and the support structure 400, the cover 300 may be lighter than a similarly sized cover made from polymer concrete. The cover 300 may therefore be easier to lift and maneuver.

As shown in FIG. 9, the cover 500 may include an upper surface 504 and a side surface 508 that may extend from the upper surface 504. The side surface 508 may be a single wall that extends entirely around the perimeter of the upper surface 504. A first slot 512a and a second slot 512b may be disposed on the upper surface 504. In the illustrated embodiment, the first and second slots 512a, 512b may be formed as elongated openings and may be formed during a molding process. The first slot 512a may aligned with the second slot 512b, and both slots 512a, 512b may extend along a common axis. The first and second slots 512a, 512b may be disposed proximate a center of the upper surface 504, and the axis extending through the first and second slots 512a, 512b may also extend through the center of the upper surface 504. In other embodiments, the first and second slots 512a, 512b may be disposed at different positions and/or may be different shapes. A first aperture 516a and a second aperture 516b may also be disposed on the upper surface 504. In other embodiments, the first and second slots 512a, 512b may be constructed and arranged to incorporate an eyebolt or fastener as an anchor to be used for lifting. In a number of embodiments, first and second slots 512a, 512b may be formed during a molding process but capable of being widened after the molding process by shaving, grinding, cutting, or by any other process known for shaping polymers. In some cases, an eyebolt may be removably disposed in first and second slots 512a, 512b by a fastener, clips, or the like so that the eyebolt may be removed or replaced if worn or damaged. In such cases, the fastener or clips may be part of the eyebolt itself.

As shown in FIGS. 2 and 3, the upper surface 504 may include different patterns along at least a portion of the upper surface 504. In some embodiments, the upper surface 504 may include the H-Dot pattern 520 (see e.g., FIG. 2). In other embodiments, the upper surface 504 may include the H pattern 530 (see e.g., FIG. 3). The patterns 520, 530 on the upper surface 504 of the cover 500 may be substantially the same as the patterns 120, 130 on the upper surface 104 of the cover 100.

As shown in FIG. 10, the cover 500 may include a lower surface 540 disposed generally opposite of the upper surface 504. The side surface 508 may extend beyond the lower surface 540 so that the lower surface 540 is recessed relative to an end of the side surface 508. Reinforcement members or ribs 544 may be coupled to the lower surface 540 and extend toward the end of the side surface 508. In the illustrated embodiment, the cover 500 may include two reinforcement members 544a, 544b.

The reinforcement members 544a, 544b may be spaced apart from the side surface 508 and aligned with one another so that an axis extends through a center of each reinforcement member 544a, 544b. As shown in the illustrated embodiment, the reinforcement members 544a, 544b may be integrally formed with a support structure 600. The support structure 600 may also extend from the lower surface 540 toward the end of the side surface 608. The support structure 600 may be disposed generally over the center of the lower surface 640 in a generally convex orientation. The reinforcement members 544a, 544b are formed proximate an outer edge of the support structure 600. As shown in the illustrated embodiment, the support structure 600 may have a generally rounded rectangular perimeter that encompasses the ribs 544a, 544b, and a circular center. As shown, a support structure 600 comprising a circular center may comprise tiered sections. Tiers comprising a rounded rectangle center or a circular center may have different radii of curvature. The edges of a rounded rectangle center may also be disposed proximate a side surface 508.

As shown in FIGS. 10-11, the reinforcement members 544a, 544b may extend partially along a height of the side surface 508, and may be spaced apart from the end of the side surface 508. The first slot 512a and the second slot 512b may extend into the first reinforcement member 544a and the second reinforcement member 544b respectively, and may extend partially along the height of the reinforcement members 544a, 544b. It is also contemplated that the reinforcement members 544a, 544b may comprise a depth or height that extends the full height of the side surface 508 or may be substantially flush with the lower surface 540. As shown in the illustrated embodiment, the first slot 512a and the second slot 512b may extend substantially the same distance through the respective reinforcement members 544a, 544b.

To form the cover 500, a mold may be created in the shape of the cover 500. A mixture may be poured into the mold and allowed to cure in order to form the cover 500. The cover 500 may be formed as a unitary piece. In the illustrated embodiment, the mixture may be a resin. For example, the material may be a glass fiber reinforced polyester sheet molding compound (SMC). In some embodiments, the material may be at least 15% glass fiber. In other embodiments, the material may be at least 25% glass fiber. In other embodiments, the material may be at least 30% glass fiber. In other embodiments, the material may be at least 48% glass fiber. In still other embodiments, the material may be polymer concrete or resin impregnated balsa wood. When the cured cover 500 may be removed from the mold. The shape of the ribs 544a, 544b and the support structure 600 may provide simplified flow patterns during the molding process. The reinforcement members 544a, 544b and the support structure 600 may provide a surface geometry that is conducive to material dispersion and flow, which may allow for a more even distribution of material in the cured cover 500. A surface pattern may be molded into the surface during the molding operation. The patterns 520, 530, or upper surface 504 may be texturized created using a chemical (e.g., aluminum oxide), sand blasting, or other methods of surface augmentation.

In use, the cover 500 may be positioned on an enclosure (e.g., a underground utility box—not shown) in a high traffic area (e.g., a sidewalk or a roadway) in a similar manner as the cover 100. The support structure 600 may provide the cover 500 with structural integrity and strength in order to withstand the weight of various objects (e.g., people, cars, etc.). The support structure 600 may help to prevent the upper surface 504 from fracturing or collapsing. The support structure 600 may provide additional strength because of its placement near the center of the lower surface 640. Particularly, the placement of the support structure 600 may provide a center of gravity for the cover 500 that may help to increase the overall force the cover 500 can withstand. Additionally, providing the first and second slots 512a, 512b in the respective first and second reinforcement member 544a, 544b may serve to maintain the geometry and integrity of the reinforcement members 544a, 544b. This may also reduce the need for extra components since the slots 512a, 512b and the reinforcement members 544a, 544b may be combined. The cover 500 may be removed from the enclosure in a similar manner to the cover 100. By using the glass fiber reinforced polyester SMC material, in combination with the support structure 600, the cover 500 may be lighter than a similarly sized cover made from polymer concrete. The cover 500 may therefore be easier to lift and maneuver.

As shown in FIG. 12, the cover 700 includes an upper surface 704 and a side surface 708 that may extend from the upper surface 704. The side surface 708 may be a single wall that extends entirely around the perimeter of the upper surface 704. It is also contemplated that side surface 708 may extend only partially around the perimeter of the upper surface 704. A first slot 712a and a second slot 712b may be disposed on the upper surface 704. In the illustrated embodiment, the first and second slots 712a, 712b may be formed as elongated openings and may be formed during a molding process. The first slot 712a may be aligned with the second slot 712b, and both slots 712a, 712b may extend along a common axis. The first and second slots 712a, 712b may be disposed proximate a center of the upper surface 704, and the axis extending through the first and second slots 712a, 712b may also extend through the center of the upper surface 704. In other embodiments, the first and second slots 712a, 712b may be disposed at different positions and/or may be different shapes. A first aperture 716a and a second aperture 716b may also be disposed on the upper surface 704. In other embodiments, the first and second slots 712a, 712b may be constructed and arranged to incorporate an eyebolt or fastener as an anchor to be used for lifting. In a number of embodiments, first and second slots 712a, 712b may be formed during a molding process but capable of being widened after the molding process by shaving, grinding, cutting, or by any other process known for shaping polymers. In some cases, an eyebolt may be removably disposed in first and second slots 712a, 712b by a fastener, clips, or the like so that the eyebolt may be removed or replaced if worn or damaged. In such cases, the fastener or clips may be part of the eyebolt itself.

As shown in FIGS. 2 and 3, the upper surface 704 may include different patterns along at least a portion of the upper surface 704. In some embodiments, the upper surface 704 may include a H-Dot pattern 720 of recesses, bosses, or recesses and bosses (see e.g., FIG. 2). In other embodiments, the upper surface 704 may include a H pattern 530 of recesses, bosses, or recesses and bosses (see e.g., FIG. 3). Additionally, the upper surface 704 of the cover may include only a textured surface or a flat upper surface 704 and no pattern.

As shown in FIG. 13, the cover 700 may include a lower surface 740 disposed generally opposite of the upper surface 704. The side surface 708 may extend beyond the lower surface 740 so that the lower surface 740 is recessed relative to an end of the side surface 708. Reinforcement members or ribs 744a, 744b, 744c, 744d may be coupled to the lower surface 740 and extend between the ends of the side surface 708. As shown in the illustrated embodiment, the cover 700 may include four ribs 744a, 744b, 744c, and 744d.

The rib 744a may underlie an axis running longitudinally across the upper surface 704 and through first and second slots 712a, 712b. The ribs 744b, 744c, and 744d may lie orthogonal to the rib 744a with rib 744c evenly bisecting the cover 700 in the lateral direction with ribs 744b, 744c, and 744d equidistantly spaced along rib 744a in the longitudinal direction. In other embodiments, ribs 744b, 744c, and 744d may not be equidistantly spaced along rib 744a in the longitudinal direction. In still other embodiments, rib 744a may not bisect the lid in the longitudinal direction.

As shown in FIG. 14, the ribs 744a, 744b, 744c, and 744d may be generally in the shape of an elongated cube but may also be of an elongated rhomboid, pyramid, or hemisphere shape. It is also contemplated that at least one of the ribs 744a, 744b, 744c, and 744d may be generally flat or may take other shapes. It is further contemplated that the ribs may each be of different depths. As non-limiting example, a flat rib may be substantially flush with lower surface 740. As another non-limiting example, a flat rib's height may extend from the lower surface 740 such that the rib 744a, 744b, 744c, or 744d height extends at least partially along a height of the side surface 708. As yet another non-limiting example, a flat rib's height may extend from the lower surface 740 such that the rib 744a, 744b, 744c, or 744d height extends along the whole height of the side surface 708. As still another non-limiting example a flat rib's height may extend from the lower surface 740 such that the rib 744a, 744b, 744c, and 744d height may cause the rib 744a, 744b, 744c, or 744d to extend beyond the height of the side surface 708. In some embodiments, the ribs 744a, 744b, 744c, or 744d may comprise different heights, depths, or slopes. In some embodiments, ribs 744a, 744b, 744c, and 744d may be in the shape of arcs. In some such embodiments, the arc of a rib may reach its apex at the center of the rib in that the rib material extending the farthest from the lower surface 740 of the cover 700 marks the apex of the arc. In some such cases, the portion of arced ribs abutting side surface 708 may be substantially flush with lower surface 740, may extend at least partially along a height of the side surface 708, may extend along the whole height of the side surface 708, or may extend beyond the height of the side surface 708. In other embodiments, the arc of a rib may reach its apex at the center of the rib in that the rib material extending the least from the lower surface 740 of the cover 700 marks the apex of the arc. In some such cases, the portion of arced ribs abutting side surface 708 may extend along the whole height of the side surface 708, may be substantially flush with lower surface 740, may extend at least partially along a height of the side surface, or may extend beyond the height of the side surface 708.

To form the cover 700, a mold may be created in the shape of the cover 700. A mixture may be poured into the mold and allowed to cure in order to form the cover 700. The cover 700 may be formed as a unitary piece. In the illustrated embodiment, the mixture may be a resin. For example, the material may be a glass fiber reinforced polyester sheet molding compound (SMC). In some embodiments, the material may be at least 15% glass fiber. In other embodiments, the material may be at least 25% glass fiber. In other embodiments, the material may be at least 30% glass fiber. In other embodiments, the material may be at least 48% glass fiber. In still other embodiments, the material may be polymer concrete or resin impregnated balsa wood. When the cured cover 700 is removed from the mold. The shape of the ribs 744a, 744b, 744c, and 774d and the support structure 700 may provide simplified flow patterns during the molding process. The ribs 744a, 744b, 744c, and 744d and the support structure 700 may provide a surface geometry that is conducive to material dispersion and flow, which may allow for a more even distribution of material in the cured cover 700. A surface pattern may be molded into the surface during the molding operation. The patterns 720, 730, or upper surface 704 may be texturized created using a chemical (e.g., aluminum oxide), sand blasting, or other methods of surface augmentation.

In use, the cover 700 may be positioned on an enclosure (e.g., a underground utility box—not shown) in a high traffic area (e.g., a sidewalk or a roadway) in a similar manner as the cover 700. The ribs 744a, 744b, 744c, and 744d may provide the cover 700 with structural integrity and strength in order to withstand the weight of various objects (e.g., people, cars, etc.). The ribs 744a, 744b, 744c, and 744d may help to prevent the upper surface 704 from fracturing or collapsing. The ribs 744a, 744b, 744c, and 744d may provide additional strength because of their placement through the center of the lower surface 740. Particularly, the placement of the ribs 744a, 744b, 744c, and 744d may provide a center of gravity for the cover 700 that may help to increase the overall force the cover 700 can withstand. Additionally, providing the first and second slots 712a, 712b in the rib 744a may serve to maintain the geometry and integrity of the rib 744a. This also reduces the need for extra components since the slots 712a, 712b and the rib 744a may be combined. The cover 700 may be removed from the enclosure in a similar manner to the cover 500. By using the glass fiber reinforced polyester SMC material, in combination with the ribs 744a, 744b, 744c, and 744d, the cover 700 may be lighter than a similarly sized cover made from polymer concrete. The cover 700 may therefore be easier to lift and maneuver.

The embodiment(s) described above and illustrated in the figures are presented by way of example only and are not intended as a limitation upon the concepts and principles of the present disclosure. As such, it will be appreciated that variations and modifications to the elements and their configurations and/or arrangement exist within the spirit and scope of one or more independent aspects as described.

What is claimed is:

1. A cover for an underground enclosure comprising:
an upper surface;
a first slot and a second slot disposed in the upper surface;
a lower surface opposite the upper surface;
a longitudinal rib coupled to the lower surface and bisecting the lower surface in a longitudinal direction; and,
at least one lateral rib coupled to the lower surface and bisecting the lower surface in a lateral direction, the lateral rib including a first arced portion abutting a first side surface of the cover and a second arced portion abutting a second side surface of the cover;
wherein the longitudinal and the at least one lateral rib intersect one another, and the first and second slot extend into the longitudinal rib and the cover is configured to be lifted by the first slot and the second slot.

2. The cover of claim 1 wherein at least one eyebolt is disposed in at least one of the first or second slot.

3. The cover of claim 1 wherein the at least one lateral rib comprises two lateral ribs coupled to the lower surface, each bisecting the cover in a lateral direction, the two ribs being spaced apart from one another and intersecting the longitudinal rib.

4. The cover of claim 1 further wherein the at least one lateral rib comprises three lateral ribs coupled to the lower surface, each bisecting the cover in a lateral direction, the three ribs each being spaced apart from one another and each intersecting the longitudinal rib.

5. The cover of claim 1 wherein at least one of the first side surface or the second side surface extends from the upper surface toward the lower surface.

6. The cover of claim 5 wherein at least one of the first side surface or the second side surface extends below the lower surface.

7. The cover of claim 5 wherein at least one of the first side surface or the second side surface is part of a single wall that extends entirely around the perimeter of the upper surface.

8. The cover of claim 5 wherein at least one of the first side surface or the second side surface extends around only a portion of the perimeter of the upper surface.

9. The cover of claim 5 wherein the cover comprises multiple additional side surfaces in addition to the first side surface and the second side surface.

10. The cover of claim 9 wherein the first side surface and the second side surface and the multiple additional side surfaces together extend entirely around the perimeter of the upper surface.

11. The cover of claim 1 wherein the longitudinal rib is flat in that does not form an arced shape.

12. A cover for an underground enclosure comprising:
an upper surface comprising a pattern of bosses;
a first slot and a second slot disposed in the upper surface;
a lower surface opposite the upper surface;
a longitudinal rib coupled to the lower surface and bisecting the lower surface in a longitudinal direction;
a lateral rib coupled to the lower surface and bisecting the lower surface in a lateral direction, including a first arced portion abutting a first side surface of the cover and a second arced portion abutting a second side surface of the cover; and,
wherein the first and second slot extend into the longitudinal rib and the cover is configured to be lifted by the first slot and the second slot.

13. The cover of claim 12 wherein the pattern of bosses comprises a pattern of raised bosses wherein at least some of the bosses extend above the upper surface at differing heights.

* * * * *